US012591406B2

(12) United States Patent
Allinson et al.

(10) Patent No.: US 12,591,406 B2
(45) Date of Patent: Mar. 31, 2026

(54) SYSTEM AND METHOD FOR GENERATING INTERACTIVE MEDIA

(71) Applicant: Universal City Studios LLC, Universal City, CA (US)

(72) Inventors: Jacob David Allinson, Orlando, FL (US); Robert Michael Jordan, Orlando, FL (US); Patrick John Goergen, Orlando, FL (US); Thomas Owen Williams, Orlando, FL (US); Mark James Traynor, Orlando, FL (US); Anthony Melo, Orlando, FL (US)

(73) Assignee: UNIVERSAL CITY STUDIOS LLC, Universal City, CA (US)

(*) Notice: Subject to any disclaimer, the term of this patent is extended or adjusted under 35 U.S.C. 154(b) by 0 days.

(21) Appl. No.: 18/104,941

(22) Filed: Feb. 2, 2023

(65) Prior Publication Data

US 2024/0264795 A1 Aug. 8, 2024

(51) Int. Cl.
*G06F 3/16* (2006.01)
*G06F 3/01* (2006.01)
(Continued)

(52) U.S. Cl.
CPC .............. *G06F 3/165* (2013.01); *G06F 3/011* (2013.01); *G06F 3/017* (2013.01); *G06F 3/033* (2013.01);
(Continued)

(58) Field of Classification Search
CPC .......... G06F 3/011; G06F 3/017; G06F 3/033; G06F 3/165; G06F 3/167; G06T 13/20;
(Continued)

(56) References Cited

U.S. PATENT DOCUMENTS

| | | |
|---|---|---|
| 9,560,445 B2 | 1/2017 | Raghuvanshi et al. |
| 9,704,491 B2 | 7/2017 | Goslin et al. |

(Continued)

FOREIGN PATENT DOCUMENTS

EP        2664165 A1    11/2013

OTHER PUBLICATIONS

PCT/US2024/013583 International Search Report and Written Opinion mailed May 13, 2024.

*Primary Examiner* — Cory A Almeida
(74) *Attorney, Agent, or Firm* — Fletcher Yoder, PC

(57) ABSTRACT

An attraction system includes a display that operates to present augmented reality and/or virtual reality (AR/VR) imagery to a guest in an interactive space. The system includes an audio controller that operates an array of speakers that are distributed throughout the interactive space and a controller having one or more processors. The one or more processors are operable to receive data indicative of a state of the guest (e.g., an action, movement, or gesture of the guest, an input received from an input device). The one or more processors are also operable to adjust the AR/VR imagery in response to the state of the guest, and instruct the audio controller to operate the array of the speakers to provide interactive audio based on the state of the guest and such that the interactive audio presents to the guest as though originating from a dynamic portion of the AR/VR imagery.

20 Claims, 4 Drawing Sheets

(51) Int. Cl.

| | |
|---|---|
| *G06F 3/033* | (2013.01) |
| *G06T 13/20* | (2011.01) |
| *H04R 3/12* | (2006.01) |
| *H04R 5/02* | (2006.01) |
| *H04R 5/04* | (2006.01) |
| *H04S 7/00* | (2006.01) |

(52) U.S. Cl.
CPC .............. *G06F 3/167* (2013.01); *G06T 13/20* (2013.01); *H04R 3/12* (2013.01); *H04R 5/02* (2013.01); *H04R 5/04* (2013.01); *H04S 7/303* (2013.01); *G06T 2200/24* (2013.01); *H04R 2201/401* (2013.01); *H04S 2400/11* (2013.01)

(58) Field of Classification Search
CPC ........ G06T 2200/24; H04R 3/12; H04R 5/02; H04R 5/04; H04R 2201/401; H04S 7/303; H04S 2400/11; G02B 27/017
See application file for complete search history.

(56) References Cited

U.S. PATENT DOCUMENTS

| | | | |
|---|---|---|---|
| 10,111,002 B1 | 10/2018 | Poulad | |
| 11,009,959 B1* | 5/2021 | Piazza ................ | G02B 27/0172 |
| 2013/0041648 A1 | 2/2013 | Osman | |
| 2014/0129937 A1* | 5/2014 | Jarvinen ................. | G06F 3/165 |
| | | | 715/716 |
| 2014/0320389 A1* | 10/2014 | Scavezze ........... | G02B 27/0172 |
| | | | 345/156 |
| 2017/0045941 A1 | 2/2017 | Tokubo et al. | |
| 2018/0220252 A1* | 8/2018 | Edry ..................... | G06T 19/006 |
| 2018/0261010 A1* | 9/2018 | Kudirka ............. | A63B 24/0021 |
| 2018/0284882 A1* | 10/2018 | Shipes .................... | G06F 3/011 |
| 2019/0385369 A1 | 12/2019 | Laaksonen et al. | |
| 2020/0089466 A1 | 3/2020 | Eronen et al. | |
| 2021/0352428 A1 | 11/2021 | Prospero et al. | |
| 2022/0036075 A1 | 2/2022 | Fradet et al. | |
| 2022/0124143 A1* | 4/2022 | Rafkind ................. | H04L 65/60 |
| 2022/0130077 A1* | 4/2022 | Rajarathnam ........... | G06F 3/011 |
| 2022/0227003 A1* | 7/2022 | Mahoor ................. | G06F 3/167 |

* cited by examiner

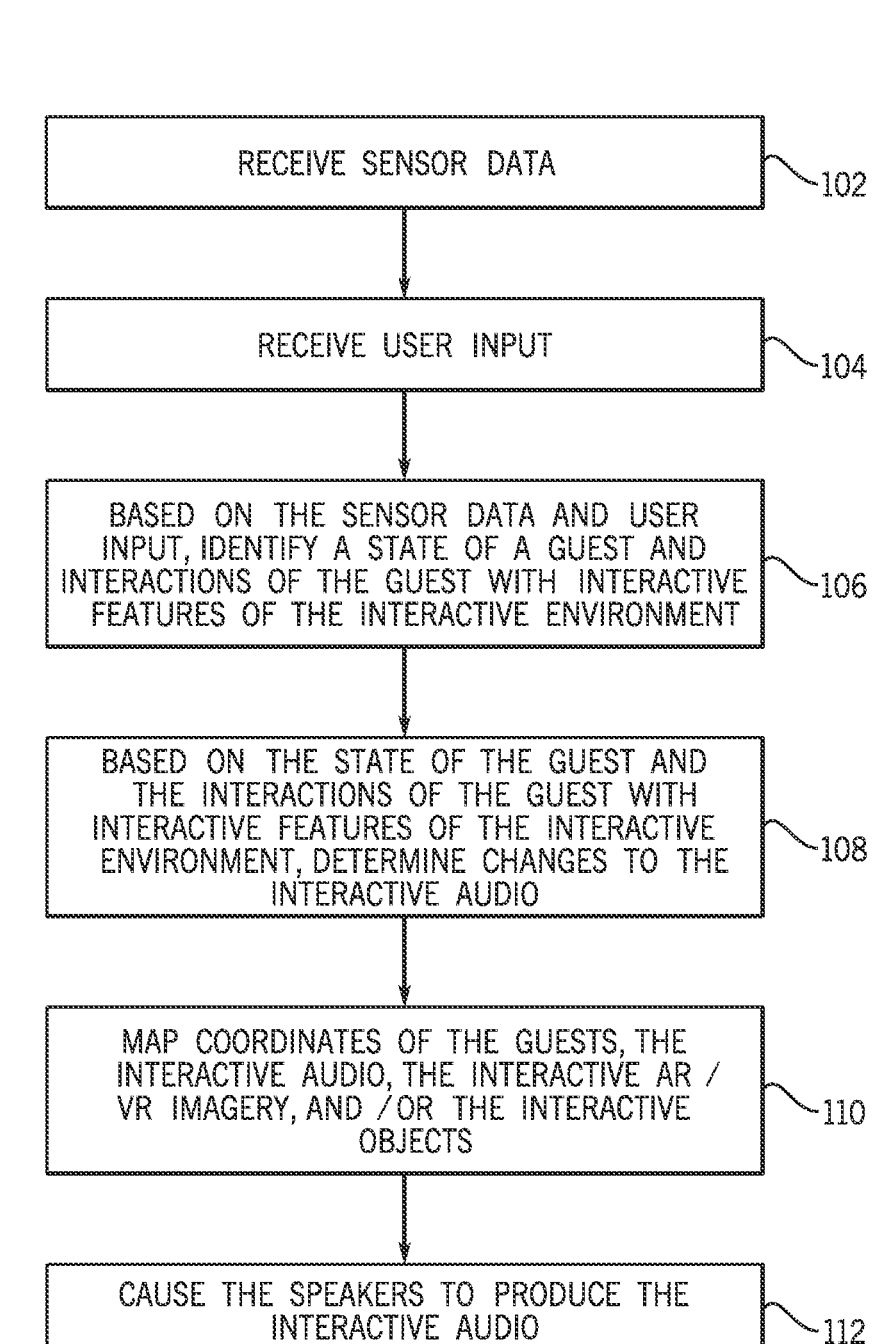

100

RECEIVE SENSOR DATA — 102

RECEIVE USER INPUT — 104

BASED ON THE SENSOR DATA AND USER INPUT, IDENTIFY A STATE OF A GUEST AND INTERACTIONS OF THE GUEST WITH INTERACTIVE FEATURES OF THE INTERACTIVE ENVIRONMENT — 106

BASED ON THE STATE OF THE GUEST AND THE INTERACTIONS OF THE GUEST WITH INTERACTIVE FEATURES OF THE INTERACTIVE ENVIRONMENT, DETERMINE CHANGES TO THE INTERACTIVE AUDIO — 108

MAP COORDINATES OF THE GUESTS, THE INTERACTIVE AUDIO, THE INTERACTIVE AR / VR IMAGERY, AND / OR THE INTERACTIVE OBJECTS — 110

CAUSE THE SPEAKERS TO PRODUCE THE INTERACTIVE AUDIO — 112

FIG. 4

SYSTEM AND METHOD FOR GENERATING INTERACTIVE MEDIA

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

An amusement park generally includes attractions that provide various experiences for users. For example, the amusement park may include different attractions, such as a roller coaster, a drop tower, a log flume, and so forth. Some attractions may include environments that provide interactive effects, such as auditory stimuli, haptic stimuli, visual stimuli, and/or other special effects, which help to provide immersive experiences for the users.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, an attraction system includes a display that operates to depict augmented reality and/or virtual reality (AR/VR) imagery to a guest in an interactive space. The system includes an audio controller configured to operate an array of speakers, wherein the speakers of the array are distributed throughout the interactive space. The system includes a controller having one or more processors, wherein the one or more processors are configured to receive data indicative of a state of the guest, wherein the state of the guest comprises an action of the guest, a movement of the guest, a gesture of the guest, a facial expression of the guest, a bodily expression of the guest, a user input received from an input device associated with the guest, or a combination thereof. The one or more processors are also configured to adjust the AR/VR imagery in response to the state of the guest, and to instruct the audio controller to operate the speakers of the array to provide interactive audio based on the state of the guest.

In an embodiment, a non-transitory computer-readable medium includes instructions that, when executed by a processor, operate to cause the processor to perform operations. The operations include: receive sensor data from a sensor; based on the sensor data, identify a first interaction of a guest with an interactive object; based on the first interaction of the guest with the interactive object, determine a first interactive audio associated with the interactive object; and instruct an array of speakers to output the first interactive audio, wherein the first interactive audio appears to originate from the interactive object.

In an embodiment, a method of providing interactive audio includes receiving, via a controller, a user input from an input device, wherein the user input indicates a trajectory of a virtual object in a virtual space. The method also includes, based on the user input, determining, via the controller, the trajectory of the virtual object in a physical space based on a mapping between the virtual space and the physical space. Further, the method includes, based on the user input, causing, via the controller, interactive augmented reality and/or virtual reality (AR/VR) imagery to include the virtual object moving according to the trajectory in the virtual space. The method also includes generating, via an audio controller, the interactive audio in the physical space based on the trajectory of the virtual object in the physical space.

DESCRIPTION OF DRAWINGS

These and other features, aspects, and advantages of the present disclosure will become better understood when the following detailed description is read with reference to the accompanying drawings in which like characters represent like parts throughout the drawings, wherein:

FIG. 4 is a flow diagram of a process of producing the interactive audio, in accordance with an aspect of the present disclosure.

DETAILED DESCRIPTION

Figure 1:
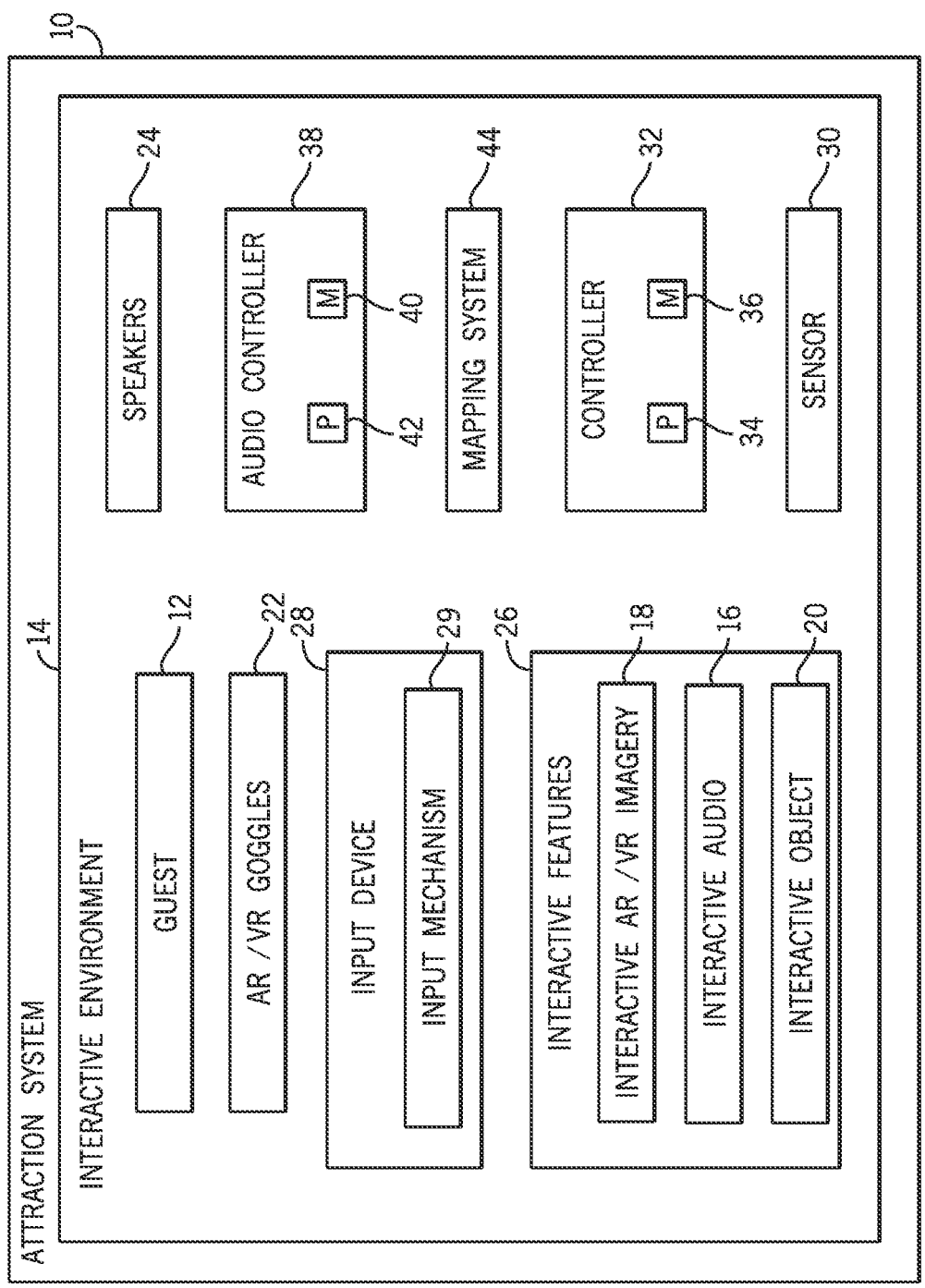
FIG. 1 is a block diagram of an attraction system, in accordance with an aspect of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure relates generally to the field of special effects for use in amusement attractions, such as an amusement park. More specifically, the present disclosure is related to systems and methods for providing interactive audio, which may be associated with an interactive augmented reality/virtual reality (AR/VR) imagery, and/or interactive objects such as physical objects, to create an immersive experience for guests of an amusement attraction. As discussed herein, the interactive audio generally corresponds to a dynamic audio output that is determined, modified, and/or presented within an interactive environment responsive to one or more inputs, such as position, movement, or gestures of a guest within the interactive environment. For example, the interactive audio, the interactive AR/VR imagery, and the interactive objects may be used to immerse the guests in an interactive environment resembling a rainforest. In this case, the interactive audio may include rainforest sounds and the interactive AR/VR imagery, which may be provided to the guests through AR/VR goggles, may include imagery (e.g., images, video, animation) of rainforest flora and fauna. The interactive audio may be provided to the guests though an array of speakers distributed throughout the amusement attraction. For example, the interactive audio may be provided such that one or more guests perceive the interactive audio as being generated by or corresponding to elements of the interactive AR/VR imagery, or being generated by or corresponding to interactive physical objects, presented or disposed within the interactive environment. In some embodiments, the array of speakers may provide binaural audio to the guests, meaning that a certain sound may be heard distinctly by each ear of a guest. That is, each guest may perceive a difference in volume and/or arrival time for respective portions of an interactive audio signal received or heard by their left and right ears. For example, if a virtual dog in the interactive AR/VR imagery (or a physical dog object or robotic dog element) appears to bark to the left of a guest in the interactive environment, the guest will hear the bark louder with the left ear and the bark will arrive at the right ear sometime after it arrives at the left ear of the guest.

The interactive environment created by the interactive audio, interactive AR/VR imagery, and/or interactive objects may evolve with the actions and movements of the guests. For example, a certain action performed by a guest may trigger a change in the interactive audio. The guest in the interactive environment may be continuously tracked by sensors distributed within the interactive environment. The sensors may include cameras, motion sensors, weight sensors, etc. The sensors may provide sensor data to a controller for processing. The controller may process the sensor data and detect certain movements, gestures, emotions, actions, positions and/or orientations of the guests. Then, based on the detected movements, gestures, emotions, actions, positions, and/or orientations of the guests, the controller may determine a possible response of the interactive audio and/or the interactive AR/VR imagery. In particular, the response may include a change in content of the interactive audio, change in position of the source (e.g., perceived source) of the interactive audio, change in coordinates of the interactive audio, change in content of the interactive AR/VR imagery, and/or change in coordinates (e.g., position and orientation) of the interactive AR/VR imagery. The interactive audio and the interactive AR/VR imagery may be adjusted in real time based on sensor data, which may be continuously collected.

To provide the adjusted interactive AR/VR imagery, the controller may instruct a display (e.g., AR/VR goggles or lenses, or a projector and projection surface) to display the change in content, position, and/or orientation, of the interactive AR/VR imagery. The controller may also provide instructions to an audio controller to provide the adjusted interactive audio. The audio controller may activate certain speakers of the array of speakers to provide certain sounds that, when combined with the sounds emitted from all the speakers in the interactive environment, may form the interactive audio audible to the guests of the amusement attraction. Each guest may hear the interactive audio differently depending on the guest's position and orientation relative to the interactive audio. For example, a guest standing to the left of a perceived source of interactive audio may hear the interactive audio differently than a guest standing to the right of the perceived source. In addition, the interactive audio may be customized according to preferences of each guest. For example, a guest with sensitive hearing may be delivered the audio at a lower volume than other guests, while a guest with a hearing impairment may be delivered the audio at a higher volume or modulated frequency.

To ensure proper scaling of the interactive audio and the interactive AR/RV imagery in the physical space (e.g., room) of the interactive environment, a mapping system may map coordinates (e.g., position, orientation, dimensions, etc.) of the guests, the interactive AR/VR imagery, and/or the interactive objects. In an embodiment, coordinates obtained by the controller may be mapped to coordinates associated with a physical space of the interactive environment, which may be used by the audio controller. For example, the coordinates obtained by the controller may be defined with respect to a certain reference point or a coordinate system that is determined by the controller. However, the coordinates used by the audio controller may be defined relative to a different reference point and/or coordinate system. Thus, the mapping performed by the mapping system may transform the coordinates of interactive elements (e.g., interactive objects, interactive AR/VR imagery, coordinates of the source of the interactive audio) from the coordinates defined relative to the reference point and/or coordinate system used by the controller to the coordinates defined relative to the reference point and/or coordinate system used by the audio controller and vice versa.

With the preceding in mind, FIG. 1 is a block diagram of an attraction system 10. The attraction system 10 may include a ride (e.g., a roller coaster), a navigation area (e.g., a walkway), a performance show, and so forth, where a guest (or guests) 12 may be located. The attraction system 10 may entertain the guest 12 by immersing the guest 12 within an interactive environment 14, where interactive audio 16, interactive augmented reality/virtual reality (AR/VR) imagery 18 (e.g., virtual objects of a display), and/or interactive objects 20 (e.g., physical objects) are provided to be accessed by the guest 12. By providing the guest 12 with the interactive audio 16, interactive AR/VR imagery 18, and/or interactive objects 20, the interactive environment 14 may simulate a particular experience, activity, or scene. For example, the interactive environment 14 may simulate a tropical rainforest by providing interactive AR/VR imagery 18 and interactive audio 16 associated with the tropical rain forest. In another example, the interactive environment 14 may provide one or more guests 12 with an experience of controlling a helicopter. In yet another example, the interactive environment 14 may facilitate an activity where guests 12 may launch virtual projectiles and score points based on successful targeting of certain portions of the virtual environment 14.

The interactive AR/VR imagery 18 may be provided to the guests 12 through AR/VR goggles 22 worn by the guests 12. Additionally, or alternatively, the interactive AR/VR imagery 18 may include projected images (e.g., images projected onto a wall or film by a projector). The interactive objects 20 may include physical objects that may be touched, modified (e.g., moved, actuated), and/or held by the guest 12. The interactive audio 16 may be provided to the guests 12 through an array of speakers 24 distributed throughout the interactive environment 14.

The interactive environment 14 may evolve based on actions of the guests 12. In particular, interactive features 26 (e.g., interactive audio 16, interactive AR/VR imagery 18, interactive objects 20) may be provided or adjusted in response to actions performed by the guests 12 within the interactive environment 14. In turn, the guests 12 may react to the interactive features 26 of the interactive environment 14, which may trigger additional changes in the interactive features 26. For example, the interactive AR/VR imagery 18 may include a representation of a helicopter (e.g., a virtual helicopter), which may be remotely controlled by the guest 12 using an input device 28 (e.g., a remote control with a joystick). The guest 12 may move the joystick in the general direction where the helicopter will be directed to go. Thus, the input device 28 may receive user input from the guest 12, and the user input may be used to control the position of the helicopter in the interactive environment 14. Watching the helicopter, the guest 12 may see the position of the helicopter changing. The guest 12 may then further adjust the position of the helicopter based on the current position (e.g., to accomplish a goal, avoid an obstacle, etc.).

The interactive AR/VR imagery 18 (and/or an interactive object 20) may be associated with the interactive audio 16. For example, if the interactive AR/VR imagery 18 includes a helicopter (e.g., a virtual helicopter) that flies around the interactive environment 14, the interactive audio 16 may include a helicopter sound. Accordingly, guests 12 may hear a helicopter sound while standing within a threshold distance from the helicopter. Since the helicopter is a virtual source of the helicopter sound, the interactive audio 16 may be louder closer to the location of the helicopter (e.g., location of the helicopter as perceived by the guests 12) and quieter further away from the location of the helicopter (e.g., location of the helicopter as perceived by the guests 12). In addition, the interactive audio 16 may move with the interactive AR/RV imagery 18 (and/or the interactive object 20) that it is associated with. For example, if the helicopter moves to the right of the guest 12, the guest 12 will hear the helicopter sound moving to the right. In this manner, the user input of the guest 12 may influence the interactive audio 16 (e.g., audio associated with the interactive object 20). In addition, the guest 12 in the interactive environment 14 may also react to the interactive audio 16. For example, if the guest 12 hears and/or sees that a virtual helicopter is too close or too loud, the guest 12 may step away, or direct the helicopter away by providing user input via the input device 28.

In the example above, the guest 12 interacts with the interactive audio 16 indirectly by manipulating the interactive AR/VR imagery 18 (e.g., the virtual helicopter) that is associated with the interactive audio 16. Additionally, or alternatively, the guest 12 may influence the interactive audio 16 directly (e.g., without manipulating the associated interactive AR/VR imagery 18 and/or interactive object 20 first). For example, consider the interactive environment 14 in which the guest 12 impersonates an orchestra conductor. Depending on how the guest 12 moves a baton, the music (e.g., interactive audio 16) heard by the guest 12 may change. For instance, moving the baton rapidly may speed up the music, lifting and holding the baton may elicit a pause, moving the baton slightly may make the music quieter, etc. Thus, in certain embodiments, the actions of the guest 12 may affect the interactive audio 16 directly, without necessarily affecting the interactive AR/VR imagery 18 or interactive object 20.

The interactive audio 16 may be provided to the guests 12 though speakers 24 (e.g., an array of two or more speakers) distributed within the interactive environment 14. Individual speakers 24 may be positioned to surround the guests 12 in the interactive environment 14. For example, the speakers 24 can be positioned on the walls, the floor, and the ceiling of the interactive environment 14 and configured to emit sound in various directions. For instance, a first speaker 24 may emit sound in a northward direction; a second speaker 24 may emit sound in a westward direction, while a third speaker 24 may emit sound in an upward direction. The speakers 24 may emit the interactive audio 16 such that the interactive audio 16 is perceived as coming from a certain source. In some embodiments, the positions of the speakers 24 and the interactive audio 16 are configured such that certain portions of the interactive audio 16 are amplified based on constructive interference, and other sounds are diminished or eliminated based on destructive interference, of the sound waves within the physical environment.

For example, the interactive audio 16 may be emitted such that it presents (e.g., is perceived by the guest 12) as though coming from a dynamic portion (e.g., a moving element, such as a depiction of a virtual bird 70) of the AR/VR imagery 18. The sound source may be the interactive object 20, a virtual object provided as a part of the interactive AR/VR imagery 18 (e.g., the virtual helicopter seen though the AR/VR goggles 22) or another portion of the interactive environment 14. For example, if the interactive environment 14 simulates rain, there may be several sound sources: a sound source corresponding to the rain drops falling on a tin roof, and a sound source corresponding to rain drops falling on an umbrella. In another example, the perceived source of the interactive audio 16 may be the interactive object 20 such as a toy dinosaur.

Since each guest 12 in the interactive environment 14 may be located at a certain distance from and at a certain orientation to the apparent and/or actual sound source, each guest 12 may experience the interactive audio 16 differently. For example, if the sound source is located between two guests 12, the guest 12 on the left will hear the interactive audio 16 associated with the sound source as coming from the right and guest 12 on the right will hear the interactive audio 16 as coming from the left. In addition, depending on the orientation of the guest 12, the interactive audio 16 received by one ear of the guest 12 may be louder than the interactive audio 16 received by another ear. Moreover, a distinct sound may arrive at one ear of the guest 12 before arriving at another ear. Accordingly, the interactive audio 16 provided through the speakers 24 may include binaural audio (e.g., audio that includes delays and slight variations in sound received at each ear of the guest 12). In certain embodiments, the interactive audio 16 may include binaural audio provided through headphones or an earpiece of an AR/VR headset.

In certain embodiments, the guests 12 may also experience the interactive audio 16 differently when different audio content of the interactive audio 16 is provided to different guests 12. In an embodiment, audio content provided to each guest 12 may be modified based on known information about the guest 12 and/or guest preferences. For example, interactive audio 16 provided to kids may be quieter than the interactive audio 16 provided to adult guests. In an embodiment, audio content provided to one guest 12 may be entirely different from audio content provided to another guest 12. For example, consider the interactive environment 14 in which virtual ghouls are following/chasing guests 12, and each ghoul may look and sound differently. One guest 12 may hear one ghoul following behind, while another guest 12 may hear a different ghoul. Moreover, depending on the individual success of each guest 12 in evading the ghouls, each guest 12 may hear the ghoul as being closer or farther behind.

To provide customized interactive audio 16 to the location of each guest 12, the guests 12 may be tracked via sensors 30. Sensors 30 may also be used to detect movements and actions of the guests 12 that may elicit an auditory and/or visual response in the interactive environment 14. In particular, various sensors 30 distributed throughout the interactive environment 14 may collect data indicative of the position, orientation, movements, gestures, emotions, and actions of the guest 12, which may be used to determine possible changes to the interactive audio 16. For example, consider the interactive environment 14 representing a cave in which each step taken by the guest 12 may trigger an audible echo. Such an interactive environment 14 may include sensors 30 embedded in the floor that detect a pressure applied to certain areas of the floor due to placement of a foot of the guest 12. The data collected by such sensors 30 (as well as the known position of such sensors 30) may be used to trigger emission of an echo sound that appears to be or presents as though originating from the area where the foot was placed. In the example of the interactive environment 14 in which the guest 12 is conducting a virtual orchestra with a baton, detection of certain movements and/or motion patterns of the baton using the sensor 30 (e.g., a camera, one or more accelerometers disposed within the baton), may trigger changes in the content of the interactive audio 16 (e.g., orchestra music). It should be appreciated the sensors 30 used in the interactive environment 14 may include a variety of different sensor types including, cameras, motion sensors, acceleration sensors, capacitance sensors, lasers for distance sensing, depth sensors, etc.

The sensor data may be received and processed by a controller 32. In particular, the controller 32 may process the sensor data to determine position coordinates of the guests 12 within the interactive environment 14. For example, the position coordinates of a guest 12 may describe a location (e.g., x, y, and z coordinates) of the guest within the interactive environment 14, a posture of the guest (e.g., standing, squatting, kneeling, prone), an orientation of the guest's eyes (e.g., a location of the guest's eyes and a direction that the guest's eyes are pointing), an orientation of the guest's ears (e.g., locations of the guest's ears and directions that the guest's ears are pointing), locations and/or orientations of guest appendages (e.g., arms, hands, fingers, legs, feet), locations and/or orientations of input devices or interactive objects possessed or controlled by the guest, or combinations thereof. Additionally, or alternatively, the controller 32 may process the sensor data to determine actions, movements, gestures, and/or emotions of the guests 12 in the interactive environment 14. As used herein, the position, orientation, movements, gestures, emotions (e.g., facial expressions and or bodily expressions), actuations (e.g., inputs via a user device) and actions of the guest 12 may be collectively referred to as a state of the guest 12. In certain embodiments, the controller 32 may include software, such as an artificial intelligence software or a computer vision software, configured to detect and/or classify certain patterns in the sensor data. For example, an artificial intelligence algorithm may analyze images of the guest 12 to detect certain emotions that may be experienced by the guest 12, which may be used to adjust the interactive audio 16. For instance, if the sensor data indicates that the guest 12 feels uncomfortable, the interactive audio 16 may be delivered to the guest 12 at lower volume. On the other hand, if the guest 12 is classified based on the sensor data as being happy or excited, the interactive audio 16 may be provided to the guest 12 at a higher volume.

In addition to interacting with the interactive features 26 (e.g., interactive objects 20, interactive audio 16, interactive AR/VR imagery 18) of the interactive environment 14 through actions, movements, and gestures, the guest 12 may also interact with interactive features 26 through input devices 28. In certain embodiments, input devices 28 may include electronic devices such as smartphones, remote control systems, tablets, electronic toy blasters, etc. Generally, an input device 28 may include an input mechanism 29 such as touchscreen, a push button, a joystick, a trigger, etc. The input mechanism 29 may enable the guest 12 to provide user input that may control an aspect of the interactive environment 14. For example, the guest 12 may control a virtual drone (e.g., interactive AR/VR imagery 18) in the interactive environment 14 using a joystick of the input device 28. In another example, the input device 28 may be a handheld blaster that may be used to launch virtual projectiles upon activation of a push button. An indication of a user input (e.g., press of a button, selection of an option on or in a touchscreen) may be sent from the input device 28 to the controller 32 for processing. In an embodiment, the input device 28 may transmit data (e.g., user selections, indications of button presses, movements of joysticks or wheels, positions of switches, trigger pulls) indicative of the user input to the controller 32 wirelessly though Bluetooth, Wi-Fi, or another suitable type of wireless communication technology. In an embodiment, the input device 28 may be communicatively coupled to the controller 32 via a cable.

After processing sensor data from the sensors 30 and/or user input data from the input devices 28, the controller 32 may generate a change in the interactive environment 14 in response to sensor data and/or user input received. The change in the interactive environment 14 may include a change in the coordinates (e.g., position, orientation) and/or content of the interactive AR/VR imagery 18, and/or a change the interactive audio 16. As discussed, the change in the position of the interactive AR/VR imagery 18 may include a change in location (e.g., relative to a reference point in the interactive environment 14) of a virtual object shown as part of the interactive AR/VR imagery 18, and the change in the content of the interactive AR/VR imagery 18 may include a change in the visual appearance of the virtual object. For example, in response to a successful targeting of a virtual object by a virtual projectile launched by the guest 12, the interactive AR/VR imagery 18 may show the virtual object exploding. The change in the interactive audio 16 may include a change in the content of the interactive audio 16 and/or a change in the position of the source of the interactive audio 16. Change in content of the interactive audio 16 may include a change in the type of audio provided. For example, a change in content of the interactive audio 16 may include a sound of an explosion that is heard in response to a successful targeting of a virtual or physical object by a virtual projectile launched by the guest 12 in the interactive environment 14.

The change in the interactive audio 16 may include a change in dimensions and/or coordinates of a three-dimensional volume associated with the interactive audio 16. It should be appreciated that a sound emitted from a sound source may be heard within a portion of three-dimensional (3D) space in vicinity of the source. Thus, an interactive audio 16 may be associated with a certain three-dimensional volume (e.g., a portion of the three-dimensional space). This three-dimensional volume may change if the interactive audio 16 changes. For example, if the interactive audio 16 becomes quieter, the 3D volume in which the interactive audio 16 is perceivable may shrink. When the location of the source of an interactive audio 16 changes, the 3D volume associated with the interactive audio 16 may be translated. When the interactive audio 16 is "emitted" in a new direction, the three-dimensional volume associated with the interactive audio 16 may be rotated about a point of the perceived audio source.

The change in the interactive audio 16 and/or the interactive AR/VR imagery 18 may be determined by a software application that runs on a processor 34 of the controller 32. The controller 32 may include a memory 36 and the processor 34. The memory 36 may include volatile memory, such as random-access memory (RAM), and/or non-volatile memory, such as read-only memory (ROM), optical drives, hard disc drives, solid-state drives, or any other non-transitory computer-readable medium that includes instructions. The processor 34 may be operable to execute such instructions. For example, the processor 34 may include one or more application specific integrated circuits (ASICs), one or more field programmable gate arrays (FPGAs), one or more general purpose processors, or any combination thereof.

To trigger a change in the interactive audio 16 (e.g., content change, or change in the position of the audio source), the controller 32 may send instructions to an audio controller 38. The audio controller 38 may then provide instructions to the speakers 24 to produce the target audio output. In an embodiment, the audio controller 38 may receive, as input, coordinates of the guests 12, coordinates associated with the audio 16, and content of the interactive audio 16. Based on this information, the audio controller 38 may determine the audio output of each individual speaker 24 to produce the interactive audio 16 with the desired content. For example, the audio controller 38 may instruct one speaker 24 to produce one type of audio and another speaker 24 to produce another type of audio. In addition, some speakers 24 may be silenced for certain time durations, while other speakers 24 may be instructed to increase the volume. The audio controller 38 may configure the sound emission from the speakers 24 such that it can be perceived by each guest 12 in the interactive environment 14 as being emitted from the sound source of the interactive audio 16. In addition, the audio controller 38 may configure the sound emission of the speakers 24 to deliver customized audio to each individual guest 12. For example, a particular guest with sensitive hearing may be delivered interactive audio 16 at a lower volume (e.g., loudness) than the other guests. Additionally, sound wave cancelation and boosting may be taken into consideration and/or exploited to achieve desired results. In other words, the speakers 24 may be operated to provide a soundscape that is customized based on the inputs to achieve desired results.

The audio controller 38 may include a second memory 40 (e.g., audio memory 40) and a second processor 42 (e.g., audio processor 42). The audio memory 40 may include volatile memory, such as random-access memory (RAM), and/or non-volatile memory, such as read-only memory (ROM), optical drives, hard disc drives, solid-state drives, or any other non-transitory computer-readable medium capable of storing instructions executable by the audio processor 42. For example, the audio processor 42 may include one or more application specific integrated circuits (ASICs), one or more field programmable gate arrays (FPGAs), one or more general purpose processors, or any combination thereof.

In an embodiment, a mapping system 44 may map coordinates obtained by the controller 32 from one coordinate system to another, such as mapping coordinates associated with the guest 12 to coordinates associated with a dynamic portion of the AR/VR imagery 18. The coordinates obtained by the controller 32 may include coordinates of guest positions, coordinates of interactive objects 20, coordinates of objects held by the guests 12, coordinates of the virtual objects that are part of interactive AR/VR imagery 18, coordinates associated with the interactive audio 16, etc. For example, in an embodiment, the coordinates obtained by the controller 32 may be defined with respect to a certain reference point or a coordinate system that is used by the controller 32. However, in certain cases, the reference point or a coordinate system used by the controller 32 may not correspond to a reference point or a coordinate system within the physical space of the interactive environment 14. For example, the coordinates obtained by the controller 32 may be defined relative to a coordinate system or a reference point within a virtual space. In some cases, the controller 32 may use a reference point or a coordinate system that corresponds to the changing locations of a moving element (e.g., a moving element in physical space, a moving element in virtual space). Thus, the coordinates obtained by the controller 32 may be mapped in order to relate or translate them in accordance with a reference point or a coordinate system in a physical space of the interactive environment 14.

For example, consider an augmented reality interactive environment 14 in which the guest 12 launches a virtual projectile, such as a tennis ball, and visualizes (e.g., through AR/VR goggles 22) the virtual tennis ball bounce around the physical room of the interactive environment 14. The trajectory of the virtual tennis ball may be determined by the controller 32. However, the controller 32 may not necessarily have a dimensionally accurate representation of the physical room (e.g., a coordinate system associated with physical positioning of one or more guests 12, interactive physical objects, and physical locations of speakers 24) where the interactive AR/VR imagery 18 is being presented. Thus, the trajectory of the virtual tennis ball (coordinates with a virtual reference point) obtained by the controller 32 may be mapped by the mapping system 44 to a trajectory in the physical room (coordinates with a physical reference point) of the interactive environment 14. The mapped trajectory may be used by the audio controller 38 to, for instance, produce realistic sound effects as the virtual tennis ball "hits" the floor and the walls of the physical room. The mapped trajectory may also be used to provide realistic visual representation of the virtual tennis ball bouncing within the physical room. Thus, the mapping system 44 may enable the controller 32 to be used in conjunction with various different physical environments (e.g., rooms) that serve as the interactive environment 14.

It should be appreciated that the mapping system 44 may be a part of the audio controller 38, a part of the controller 32, or may be external to the controller 32 and the audio controller 38. The mapping system 44 may send and receive the data via a wireless communication protocols, such as Bluetooth or Wi-Fi, or via a wired connection. In certain embodiments, the controller 32 and the audio controller 38 may be combined into a single device or system. The mapping system 44 may use any of various types of mapping techniques (e.g., light detection and ranging (LiDAR), Wi-Fi signal-based measurements) to map a physical environment.

While described herein as input devices 28, it should be noted that, in some embodiments, at least one of the input devices 28 may provide outputs that contribute to the interactive audio presented to the guests 12. For example, in some embodiments, at least one input device 28 (e.g., a projection launcher, interactive gloves, a game controller, a conductor baton) may include at least one of the speakers 24 of the interactive environment 14. For such embodiments, the input device 28 may be communicatively coupled to the controller 32 to provide information about the position and/or orientation of the input device 28, as well as inputs received by the input device 28. Additionally, the input device 28 may be communicatively coupled to the audio controller 38 to receive instructions to produce at least a portion of the interactive audio in the interactive environment 14 using the at least one speaker 24 of the input device, in accordance with the present disclosure.

Figure 2:
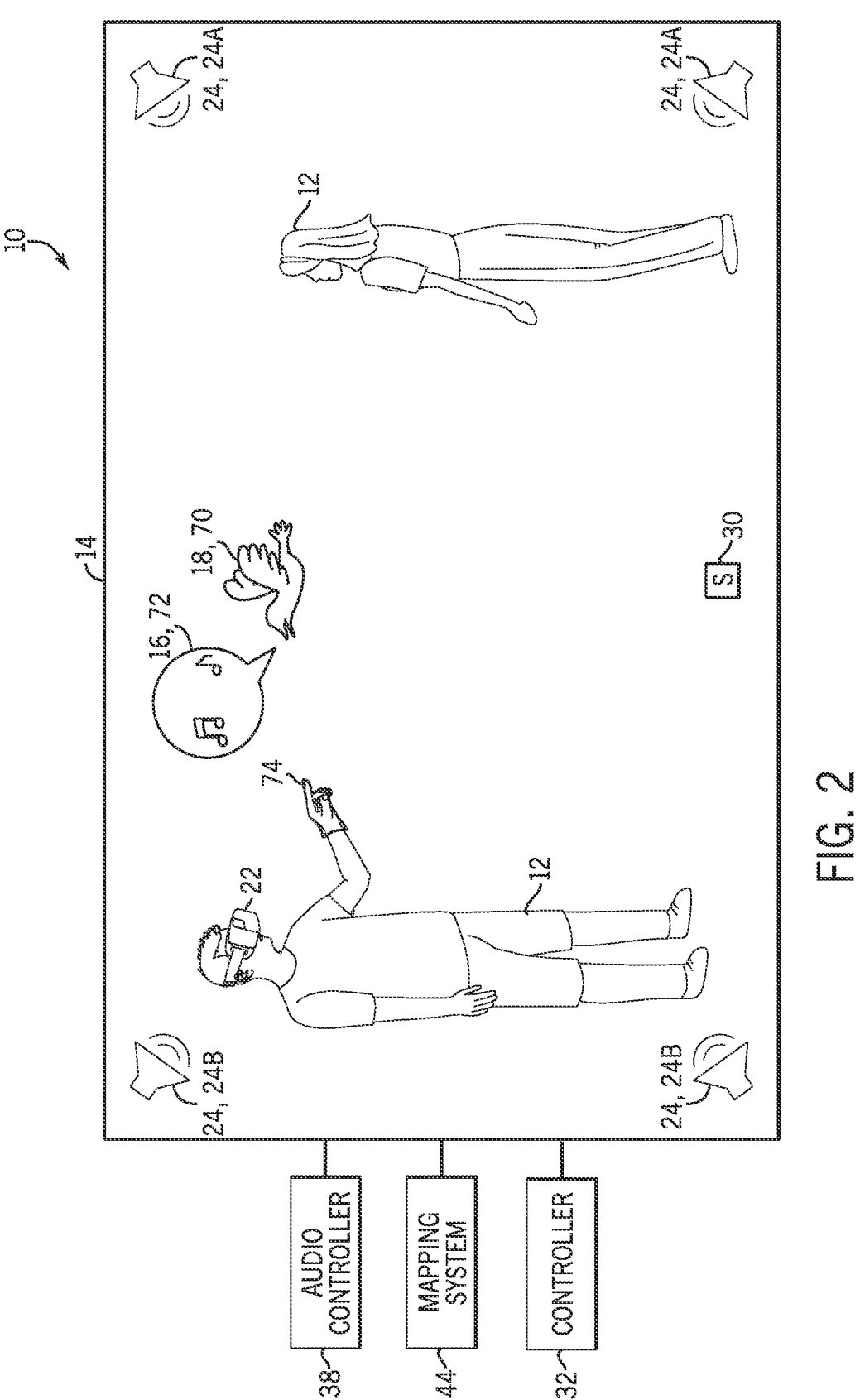
FIG. 2 is a schematic diagram of an attraction system including an interactive environment in which a guest may interact with interactive audio, in accordance with an aspect of the present disclosure.

FIG. 2 is a schematic diagram of an attraction system 10 that includes an interactive environment 14 in which guests 12 interact with interactive AR/VR imagery 18 associated with an interactive audio 16. In the illustrated example, the interactive AR/VR imagery 18 is that of the virtual bird 70 that may be seen by the guests 12 through AR/VR goggles 22. The virtual bird 70 is associated with interactive audio 16 emitted by the speakers 24, which are distributed in an array within the interactive environment 14. For example, the interactive audio 16 may include a bird song 72 of the virtual bird 70. Accordingly, as the position and/or orientation of the virtual bird 70 changes, the bird song 72 may be perceived by the guests 12 as coming from different directions.

The guest 12 may control the position of the virtual bird 70 with a gesture of a hand, such that the virtual bird 70 appears in a location at which the guest 12 is pointing. In particular, the guest 12 may be wearing a glove, which may be tracked by the sensor 30 and used to detect the gesture. For example, pointing upward with a gloved hand 74 may instruct the virtual bird 70 to move upward. The sensor 30, such as a camera, may capture images of the gloved hand 74 and/or otherwise collect data associated with the gloved hand 74. The sensor data may be received by the controller 32, which determines the coordinates (e.g., position and orientation coordinates) of the gloved hand 74 relative to a reference point within the interactive environment 14. The coordinates (e.g., position and orientation) associated with the gloved hand 74 may be compared to the previously recorded coordinates to determine whether the gesture performed by hand has changed. If so, the position and orientation of the virtual bird 70 may be adjusted. For example, when the position and/or orientation of the gloved hand 74 changes from the previously recorded positon and/or orientation by at least a threshold amount, the controller 32 determines that the virtual bird 70 should move. In addition, the controller 32 may identify a new adjusted coordinates (e.g., position and/or orientation) of the virtual bird 70 based on the change in the coordinates of the gloved hand 74. The controller 32 may then send instructions to the AR/VR goggles 22 worn by the guest 12 to instruct the AR/VR goggles 22 to display the virtual bird 70 at the adjusted position.

After the position of the virtual bird 70 is adjusted, the bird song 72 may be heard as coming from the adjusted position of the virtual bird 70. Accordingly, the controller 32 may send instructions to the audio controller 38 to adjust the interactive audio 16 such that it is perceived by the guests 12 as coming from the adjusted position. In particular, the instructions sent to the audio controller 38 may include the coordinates of the guests 12 in the interactive environment 14, the coordinates of the gloved hand 74, coordinates of the adjusted position of the virtual bird 70, coordinates of the three-dimensional volume to be filled with the bird song 72 sound, etc. The audio controller 38 may, based on the instructions from the controller 32, identify which speakers 24 on or in the interactive environment 14 should be activated to produce the bird song 72 audio based on the current position of the virtual bird 70. In addition, the audio controller 38 may identify which speaker 24 (or combination of speakers 24) should produce different portions of the bird song 72 audio and at which respective volumes. For example, since the virtual bird 70 is illustrated as facing left in FIG. 2, the speakers 24A that are located on or in the right of the interactive environment 14 may be instructed to produce the bird song 72 audio. Meanwhile, speakers 24B on or in the left side of the interactive environment 14 may be silenced. In yet other embodiments, certain sound waves from different speakers may be emitted with the understanding that they will cancel each other in certain locations, amplify each other in other locations, and so forth.

In an embodiment, the coordinates (e.g., position and orientation) of the gloved hand 74, coordinates of the virtual bird 70, and coordinates of the 3D volume filled with the bird song 72 audio may be mapped by the mapping system 44 prior to being sent to the audio controller 38. In particular, the mapping system 44 may map the coordinates from the coordinates defined relative to a reference point used by the controller 32 to the coordinates defined relative to a reference point within the physical space of the interactive environment 14. In an embodiment, mapping the coordinates may include multiplying the coordinates by a scaling factor, translating the coordinates, etc.

Figure 3:
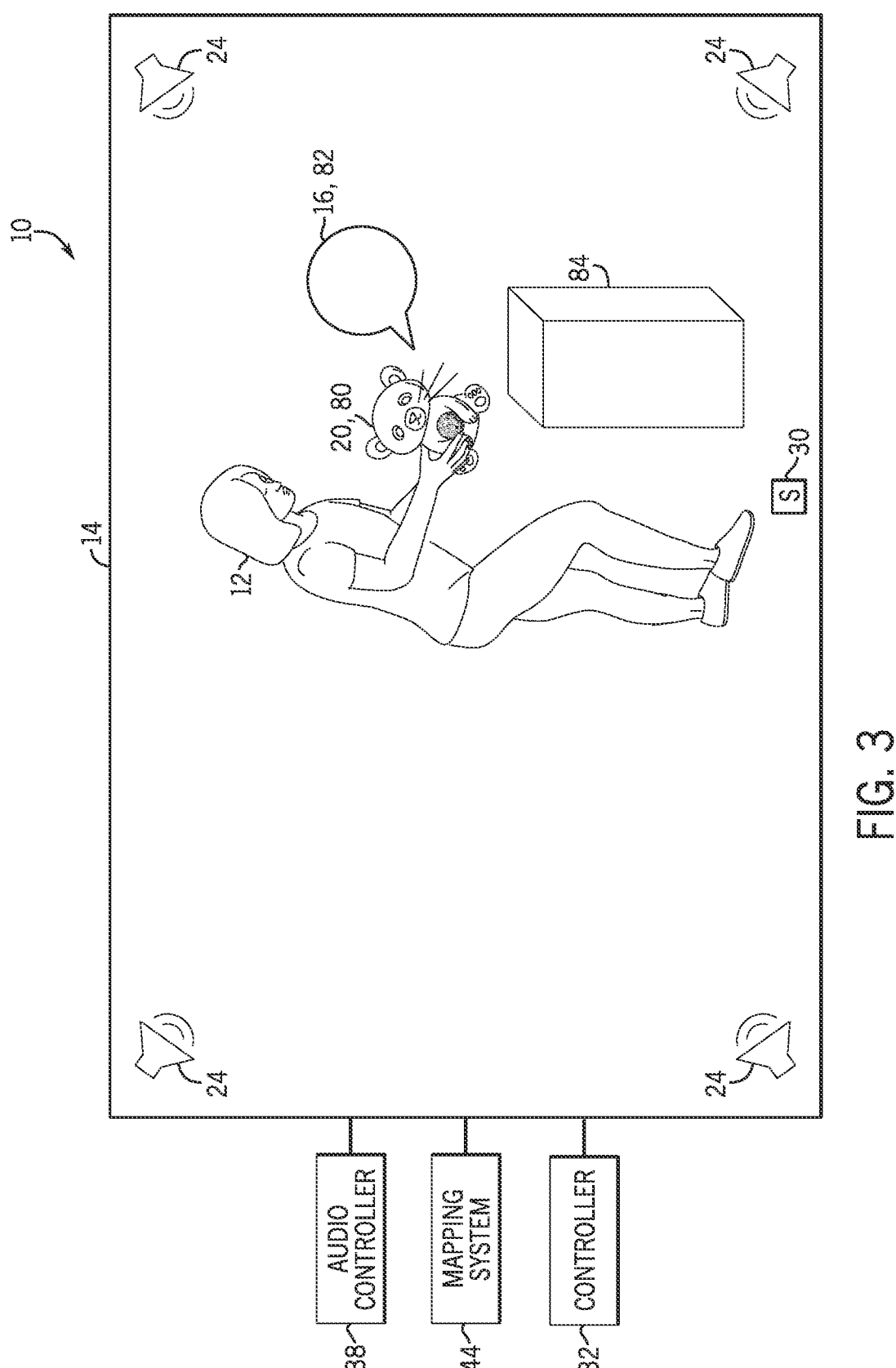
FIG. 3 is a schematic diagram of an attraction system including a virtual environment where an interactive object (e.g., physical object) appears to emit the interactive audio in response to an interaction with the guest, in accordance with an aspect of the present disclosure.

Just as the interactive audio 16 may appear to be emitted by a virtual object that is a part of the interactive AR/VR imagery 18, the interactive audio 16 may also appear to be emitted by physical interactive objects 20. FIG. 3 is a schematic diagram of the attraction system 10 including a virtual interactive environment 14 in which the interactive object 20 (e.g., physical object, a game piece, a game item or weapon, a prop, a tool, an input device) appears to emit the interactive audio 16 in response to an interaction with the guest 12. In the illustrated embodiment, the interactive object 20 is a teddy bear 80. In some embodiments, the teddy bear 80 may not have any speakers 24 embedded in it. Instead, the interactive environment 14 may have multiple speakers 24 that are configured emit interactive audio 16 that may be perceived as the teddy bear 80 speaking. In addition, the speech 82 of the teddy bear 80 may be triggered, for example, by the guest 12 picking up the teddy bear 80 (e.g., from a stand 84). Accordingly, a sensor 30, such as a camera or a motion sensor, may be used to detect whether the guest 12 has picked up the teddy bear 80. Additionally, or alternatively, a sensor 30 that senses a change in the weight/pressure applied to the top of the stand 84 may be embedded on or in the stand 84.

The sensor data from the sensor 30 may be analyzed by the controller 32 to determine whether the teddy bear 80 has been picked up by the guest 12. If the teddy bear 80 has been picked up by the guest 12, the controller 32 may trigger the emission of the interactive audio 16. In particular, the controller 32 may send the coordinates of the teddy bear 80 and the guest 12 to the audio controller 38 with an indication or instruction to emit the interactive audio 16. Since the interactive audio 16 may appear be produced by the teddy bear 80, the source and direction of the interactive audio 16 may be determined based on the position coordinates of the guest 12 and the teddy bear 80. Then, the audio controller 38 may activate certain speakers 24 found in the interactive environment 14 to produce the interactive audio 16 that appears to be directed away from the teddy bear 80 and toward the guest 12. In an embodiment, the coordinates of the teddy bear 80 and the guest 12 may be mapped by the mapping system 44 prior to being utilized by the audio controller 38. In particular, the mapping may involve translating the coordinates from one coordinate system to another, transforming the coordinates from a virtual space constructed by the controller 32 to a physical space of the interactive environment 14, redefining the coordinates relative to a new reference point, etc.

It should be appreciated that the different types of interactive audio 16 may be provided based on the type of interaction (e.g., action, movement, emotion, user input, gesture) of the guest 12 with the interactive object 20. For example, the teddy bear 80 may say "hello" in response to being picked up and say "goodbye" in response to being put back on or in the stand 84.

FIG. 4 is a flow diagram of an embodiment of a process 100 for producing the interactive audio 16. It should be noted that reference numerals of structural features provided below are illustrated in various embodiments of FIGS. 1-3. The process 100 includes receiving (block 102) sensor data from various sensors 30 found in the interactive environment 14. As discussed, the sensor data may be indicative of various interactions of the guests 12 with the interactive environment 14. In particular, the sensor data may indicate an identity and a current position and orientation of the guests 12, as well as movements, actions, gestures, and/or emotions of the guests 12.

For the embodiment illustrated in FIG. 4, the process 100 also includes receiving (block 104) user input (e.g., from an input device 28, from the sensors 30). As discussed, in certain embodiments, the guests 12 of the attraction system 10 may interact with various interactive features 26 of the interactive environment 14 by providing user input via the input device 28. The user input provided via the input device 28 may, for example, control a portion of the interactive AR/VR imagery 18. For example, the input device 28, such as a smartphone, may be used to remotely control a virtual helicopter. In this case, the user input may be received though the touchscreen of the smartphone and include user-provided indications to adjust the position of the virtual helicopter. In another example, the input device 28, such as a blaster, may be used by the guests 12 to launch virtual projectiles. In this case, the user input may include an indication that a push button has been triggered to release the virtual projectile.

For the embodiment illustrated in FIG. 4, the process 100 includes identifying (block 106) the state of the guest 12 in the interactive environment 14 and interactions of the guests 12 with elements of the interactive environment 14 based on sensor data and/or input data. The state of the guest 12 may include coordinates (e.g., position, orientation), movements, gestures, emotions, and/or actions of the guest 12. Identifying the position of the guest 12 may enable the audio controller 38 to deliver customized audio to each or all of the guests 12. In addition, position of the guest 12 may be used to provide interactive audio 16 originating at the position of the guest 12, e.g., amplifying the sound of footsteps of a particular guest 12 for the benefit of the guest 12 and other guests 12. Moreover, the position and orientation of the guest 12 may be used to provide customized audio to the guest 12. For example, a certain guest 12 may be provided with a quieter audio. The movements, gestures, emotions, and/or actions of the guest 12 may be indicative of the interactions of the guest 12 with the interactive features 26 of the interactive environment 14. For example, in a certain interactive environment 14, a gesture of a hand of the guest 12 may be used to control the interactive AR/VR imagery 18. In addition, the interactions of the guests 12 with the interactive features 26 of the interactive environment 14 may be provided as user input. For example, an input device 28 may be used to control the interactive AR/VR imagery 18.

For the embodiment illustrated in FIG. 4, the process 100 includes determining (block 108) changes to the interactive audio 16 based on the state of the guest 12 and the interactions of the guest 12 with the interactive features 26 of the interactive environment 14. The changes to the interactive audio 16 may include possible changes to the content of the interactive audio 16, changes to the position and orientation of the source of the interactive audio 16, and/or changes to the 3D volume occupied or traversed by the interactive audio 16. Generally, such changes to the interactive audio 16 may cause the interactive audio 16 to be perceived differently by the guests 12. For example, as coming from a new direction, becoming louder, moving toward or away, etc.

For the embodiment illustrated in FIG. 4, the process 100 includes mapping (block 110) of the position coordinates of the guests 12, the interactive audio 16, the interactive AR/VR imagery 18, and/or the interactive objects 20 by the mapping system 44. In an embodiment, mapping the coordinates may include translating the coordinates from one coordinate system to another, defining the coordinates relative to a new reference point, adapting the coordinates to a new space, etc. For example, the coordinates may be mapped from the coordinates defined relative to a reference point used by the controller 32 to coordinates defined relative to a reference point used by the audio controller 38. The mapping may be applied when, for example, the controller 32 determines the coordinates in a virtual space and the audio controller 38 utilizes coordinates that are defined in a physical space of the virtual environment 14. In some instances, a model (e.g., a trained machine learning or artificial intelligence model) may be used to translate the coordinates of the virtual space into suitable coordinates for the physical space. In some embodiments, the model may be a software-based construction (e.g., a virtual environment) that is a digital twin of the physical environment and includes digital twins of environmental components, such as a virtual array of speakers that is a digital twin of a physical array of speakers.

For the embodiment illustrated in FIG. 4, the process 100 includes causing or signaling (block 112) the speakers 24 to produce the interactive audio 16. As discussed, the audio controller 38 may instruct the speakers 24 distributed throughout the interactive environment 14 to emit the interactive audio 16 such that the interactive audio 16 appears to be emitted by a portion of the interactive AR/VR imagery 18 and/or the interactive object 20. It should be appreciated that the interactive audio 16 heard by the guests 12 may be a composition of sounds produced by various speakers 24. That is, each speaker 24 may be instructed to emit a different sound that, when combined with sounds emitted from other speakers 24, may form the interactive audio 16. In addition, constructive and destructive interference of the sound waves emitted by various speakers 24 may be used to produce certain auditory effects, such as quiet regions or loud regions within the interactive environment 14. Moreover, the speakers 24 may be configured to emit the interactive audio 16 in a manner that provides a custom audio to each guest 12. For example, one guest 12 may hear one type of audio content, while another guest 12 may hear another type of audio content.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An attraction system comprising:
a display configured to depict augmented reality and/or virtual reality (AR/VR) imagery to a guest of a plurality of guests in an interactive physical space;
an audio controller configured to operate an array of speakers, wherein the speakers of the array are distributed throughout the interactive physical space; and
a controller comprising one or more processors, wherein the one or more processors are configured to:
instruct the audio controller to operate the speakers of the array within the interactive physical space to provide interactive audio corresponding to the AR/VR imagery;
receive data indicative of a facial expression of the guest within the interactive physical space;
adjust the AR/VR imagery in response to the facial expression of the guest; and
instruct the audio controller to operate the speakers of the array within the interactive physical space to provide updated interactive audio based on the facial expression of the guest within the interactive physical space.

2. The attraction system of claim 1, wherein the AR/VR imagery comprises imagery displayed on or by AR/VR lenses, imagery projected by a projector, or a combination thereof.

3. The attraction system of claim 1, comprising a virtual model stored on or in the controller, wherein the virtual model includes a digital twin of the array of speakers.

4. The attraction system of claim 1, comprising a mapping system configured to map coordinates associated with the guest from a first coordinate system to a second coordinate system associated with a dynamic portion of the AR/VR imagery, wherein the interactive audio and the updated interactive audio presents to the guest as though originating from the dynamic portion of the AR/VR imagery.

5. The attraction system of claim 1, comprising a mapping system configured to map coordinates associated with a dynamic portion of the AR/VR imagery from a first coordinate system to a second coordinate system associated with a physical location of the guest, wherein the interactive audio and the updated interactive audio presents to the guest as though originating from the dynamic portion of the AR/VR imagery.

6. The attraction system of claim 1, wherein the one or more processors of the controller are configured to perform mappings between a first coordinate system and a second coordinate system, the first coordinate system is associated with the interactive physical space and the second coordinate system is associated with a virtual model.

7. The attraction system of claim 6, wherein the first coordinate system includes:
position coordinates of the guest in the interactive physical space, including one or more of: a location of the guest, a posture of the guest, a location or orientation of at least one eye of the guest, a location or orientation of at least one ear of the guest, and a location or orientation of at least one appendage of the guest; and
location coordinates of the speakers of the array in the interactive physical space.

8. The attraction system of claim 6, wherein the first coordinate system is associated with the controller and the second coordinate system is associated with the audio controller.

9. The attraction system of claim 1, wherein an input device associated with the guest includes at least one speaker of the array, and wherein the input device is communicatively coupled to the audio controller to receive instructions to provide at least a portion of the interactive audio or the updated interactive audio via the at least one speaker of the input device.

10. The attraction system of claim 1, wherein providing the interactive audio or the updated interactive audio comprises changing source locations of the interactive audio or the updated interactive audio.

11. The attraction system of claim 1, wherein the audio controller is configured to instruct the array of speakers to produce the interactive audio and the updated interactive audio such that the guest perceives the interactive audio and the updated interactive audio as originating from an interactive physical object within the interactive physical space.

12. The attraction system of claim 1, wherein the one or more processors are configured to instruct the audio controller to operate the speakers of the array such that the interactive audio or the updated interactive audio heard by a first guest is different from the interactive audio or the updated interactive audio heard by a second guest.

13. The attraction system of claim 1, wherein the updated interactive audio is modified relative to the interactive audio based on the facial expression of the guest.

14. A non-transitory, computer-readable medium comprising instructions for providing interactive audio, the instructions, when executed by one or more processors of a processor system of a controller, are configured to cause the processor system to perform operations comprising:
instructing an audio controller configured to operate an array of speakers distributed throughout an interactive physical space to provide interactive audio corresponding to augmented reality and/or virtual reality (AR/VR) imagery presented via a display to a guest of a plurality of guests in the interactive physical space;
receiving data indicative of a facial expression of the guest within the interactive physical space;
adjusting the AR/VR imagery in response to the facial expression of the guest; and
instructing the audio controller to operate the speakers of the array within the interactive physical space to provide updated interactive audio based on the facial expression of the guest within the interactive physical space.

15. The non-transitory, computer-readable medium of claim 14, wherein the AR/VR imagery comprises imagery displayed on or by AR/VR lenses, imagery projected by a projector, or a combination thereof.

16. The non-transitory, computer-readable medium of claim 14, wherein the instructions, when executed by the one or more processors, are configured to cause the processor system to instruct the audio controller to produce the interactive audio or the updated interactive audio via the array of speakers such that the guest perceives the interactive audio or the updated interactive audio as originating from an interactive physical object within the interactive physical space.

17. The non-transitory, computer-readable medium of claim 14, wherein the instructions, when executed by the one or more processors, are configured to cause the processor system to instruct the audio controller to produce the interactive audio or the updated interactive audio such that the interactive audio or the updated interactive audio heard by a first guest is different from the interactive audio or the updated interactive audio heard by a second guest.

18. A method for generating interactive audio, the method comprising:

instructing, via one or more processors of a processor system of a controller, an audio controller to provide the interactive audio corresponding to augmented reality and/or virtual reality (AR/VR) imagery presented to a guest of a plurality of guests within an interactive physical space;

operating, via the audio controller, an array of speakers distributed throughout the interactive physical space to provide the interactive audio;

receiving, via the processor system, data indicative of a facial expression of the guest within the interactive physical space;

adjusting, via the processor system, the AR/VR imagery in response to the facial expression of the guest; and instructing, via the processor system, the audio controller to operate the speakers of the array within the interactive physical space to provide updated interactive audio based on the facial expression of the guest within the interactive physical space.

19. The method of claim 18, comprising performing mappings between a first coordinate system and a second coordinate system, the first coordinate system being associated with the interactive physical space, and the second coordinate system being associated with a virtual model.

20. The method of claim 19, wherein the first coordinate system includes:

position coordinates of the guest in the interactive physical space; and location coordinates of the speakers of the array in the interactive physical space.

\* \* \* \* \*